(12) United States Patent
Resmini et al.

(10) Patent No.: US 8,240,350 B2
(45) Date of Patent: Aug. 14, 2012

(54) TIRE AND CROSSLINKABLE ELASTOMERIC COMPOSITION

(75) Inventors: Emiliano Resmini, Milan (IT); Francesca Baione, Milan (IT); Diego Tirelli, Milan (IT); Luigi Fino, Milan (IT); Maurizio Galimberti, Milan (IT); Attilio Citterio, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 599 days.

(21) Appl. No.: 11/919,423

(22) PCT Filed: Apr. 28, 2005

(86) PCT No.: PCT/EP2005/004563
§ 371 (c)(1),
(2), (4) Date: Sep. 17, 2009

(87) PCT Pub. No.: WO2006/114124
PCT Pub. Date: Nov. 2, 2006

(65) Prior Publication Data
US 2010/0069529 A1    Mar. 18, 2010

(51) Int. Cl.
*B60C 1/00* (2006.01)
*B60C 11/00* (2006.01)
*B60C 13/00* (2006.01)
*C08F 20/00* (2006.01)

(52) U.S. Cl. .............. 152/450; 152/209.5; 152/525; 524/522; 526/317.1

(58) Field of Classification Search .......... 152/510, 152/DIG. 16; 524/445–447, 522; 501/145, 501/146, 148; 526/333, 332, 317.1–318.6
See application file for complete search history.

(56) References Cited

U.S. PATENT DOCUMENTS

| 4,341,672 A | 7/1982 | Hsieh et al. |
| 4,550,142 A | 10/1985 | Akita et al. |
| 4,574,140 A | 3/1986 | Sandstrom et al. |
| 4,742,124 A | 5/1988 | Tsutsumi et al. |
| 4,768,937 A | 9/1988 | Singh |

(Continued)

FOREIGN PATENT DOCUMENTS
EP       0 199 064 A2    10/1986
(Continued)

OTHER PUBLICATIONS

Posiva: Analysis of Cement Superplasticizers and Grinding Aids A Literature Survey, 2007.*

(Continued)

*Primary Examiner* — Justin Fischer
(74) *Attorney, Agent, or Firm* — Finnegan, Henderson, Farabow, Garrett & Dunner, L.L.P.

(57) ABSTRACT

A tire includes at least one structural element including a crosslinked elastomeric material obtained by crosslinking a crosslinkable elastomeric composition including: (a) an amount higher than or equal to 30 phr, preferably 40 phr to 100 phr, of at least one polyisoprene rubber; (b) an amount lower than or equal to 70 phr, preferably 0 phr to 60 phr, of at least one diene elastomeric polymer other than the polyisoprene rubber (a); (c) an amount higher than or equal to 30 phr, preferably 40 phr to 120 phr, of at least one carbon black reinforcing filler; (d) 0.2 phr to 10 phr, preferably 1 phr to 5 phr, of at least one copolymer of at least one ethylenically unsaturated carboxylic acid or a derivative thereof with at least one ethylenically unsaturated monomer containing at least one polyoxyalkylene side chain. Preferably, the structural element is a tire's sidewall.

52 Claims, 4 Drawing Sheets

U.S. PATENT DOCUMENTS

| | | | |
|---|---|---|---|
| 4,871,004 A | 10/1989 | Brown et al. | |
| 4,872,822 A | 10/1989 | Pizzorno | |
| 5,130,369 A * | 7/1992 | Hughes et al. | 524/846 |
| 5,238,040 A | 8/1993 | Ghilardi | |
| 5,362,324 A | 11/1994 | Cerulli et al. | |
| 5,374,671 A | 12/1994 | Corvasce et al. | |
| 5,545,680 A * | 8/1996 | Corvasce et al. | 524/47 |
| 5,672,639 A | 9/1997 | Corvasce et al. | |
| 5,717,022 A | 2/1998 | Beckmann et al. | |
| 5,738,158 A * | 4/1998 | Ozawa et al. | 152/510 |
| 5,798,425 A | 8/1998 | Albrecht et al. | |
| 6,230,773 B1 | 5/2001 | Sandstrom et al. | |
| 6,598,632 B1 * | 7/2003 | Moreland et al. | 152/151 |
| 6,777,517 B1 * | 8/2004 | Albrecht et al. | 526/317.1 |
| 7,365,112 B2 * | 4/2008 | Shiraishi et al. | 524/110 |
| 2001/0031821 A1* | 10/2001 | Scholl et al. | 524/492 |
| 2002/0061955 A1 | 5/2002 | Colvin et al. | |
| 2003/0109625 A1* | 6/2003 | Galimberti et al. | 524/495 |
| 2003/0119965 A1* | 6/2003 | Galimberti et al. | 524/492 |
| 2003/0144384 A1* | 7/2003 | Chen et al. | 524/2 |
| 2005/0027058 A1* | 2/2005 | Dias et al. | 524/445 |
| 2005/0154121 A1* | 7/2005 | Fan et al. | 524/556 |
| 2007/0287817 A1* | 12/2007 | Maier et al. | 526/320 |
| 2009/0212467 A1* | 8/2009 | Nahmias et al. | 264/501 |
| 2010/0069529 A1* | 3/2010 | Resmini et al. | 523/150 |
| 2010/0089512 A1* | 4/2010 | Baione et al. | 152/537 |

FOREIGN PATENT DOCUMENTS

| | | |
|---|---|---|
| EP | 0 451 604 A2 | 10/1991 |
| EP | 0 501 227 A1 | 9/1992 |
| EP | 0 691 218 A2 | 1/1996 |
| EP | 0 801 112 A2 | 10/1997 |
| EP | 0 890 603 A1 | 1/1999 |
| EP | 0 890 606 A1 | 1/1999 |
| EP | 0 896 981 A1 | 2/1999 |
| EP | 0 928 680 A1 | 7/1999 |
| EP | 0 928 702 A1 | 7/1999 |
| EP | 0 943 466 A2 | 9/1999 |
| EP | 1 188 786 A1 | 3/2002 |
| EP | 1 189 744 | 3/2002 |
| EP | 1 241 204 A1 | 9/2002 |
| WO | WO 00/24596 | 5/2000 |
| WO | WO 01/00395 A1 | 1/2001 |
| WO | WO 01/49786 A1 | 7/2001 |
| WO | WO 02/100936 * | 12/2002 |
| WO | WO 03/106369 A1 | 12/2003 |
| WO | WO 2004056586 A1 * | 7/2004 |
| WO | WO 2006039942 A1 * | 4/2006 |
| WO | WO 2006 114125 A1 | 11/2006 |
| WO | WO 2006114124 A1 * | 11/2006 |
| WO | WO 2006114125 A1 * | 11/2006 |

OTHER PUBLICATIONS

MELPERS® PP100F, 2000.*

Midorikawa, et al., "Pneumatic Tire", Patent Abstracts of Japan, Publication No. 05170976 A, filed Jul. 9, 1993.

Schulz, et al., "Recent Advances in the Chemical Modification of Unsaturated Polymers", Rubber Chemistry and Technology, vol. 55, pp. 809-859, (1982).

* cited by examiner

TIRE AND CROSSLINKABLE ELASTOMERIC COMPOSITION

CROSS REFERENCE TO RELATED APPLICATION

This application is a national phase application based on PCT/EP2005/004563, filed Apr. 28, 2005, the content of which is incorporated herein by reference.

BACKGROUND OF THE INVENTION

Field of the Invention

The present invention relates to a tire and to a crosslinkable elastomeric composition.

More in particular the present invention relates to a tire including at least one structural element obtained by crosslinking a crosslinkable elastomeric composition comprising at least one polyisoprene rubber, at least one carbon black reinforcing filler and at least one modified polycarboxylate.

Moreover, the present invention also relates to a crosslinkable elastomeric composition comprising at least one polyisoprene rubber, at least one carbon black reinforcing filler and at least one modified polycarboxylate, as well as to a crosslinked manufactured article obtained by crosslinking said crosslinkable elastomeric composition.

Description of the Related Art

In the rubber industry, in particular that of tires, it is known practice to add organic fibres such as, for example, polyamide fibres (in particular, aromatic polyamide fibres known as "aramide fibres"), polyester fibres or polyolefin fibres, to elastomeric compositions, in order to improve their mechanical properties, in particular in terms of tensile modulus and dynamic elastic modulus.

For example, U.S. Pat. No. 4,871,004 discloses a composition comprising a crosslinkable elastomer and an effective amount of aramid fibres. Examples of crosslinkable elastomers which are useful for this purpose are: natural rubber, cis-1,4-polyisoprene, polybutadiene (in solution or in emulsion), styrene/butadiene copolymers (in solution or in emulsion), butyl rubbers and halobutyl rubbers, EPDM, butadiene/acrylonitrile rubbers, neoprene, vinylpolybutadiene and, in general, polymers with viscoelastic properties, or blends thereof. Said composition is said to be usable in all cases in which rubbers with a high level of hardness and/or a high modulus are required, in particular in vehicle tires (for example as bead, filler). One of the reasons which justifies the use of the abovementioned fibres is the improvement in the structural strength of the crosslinked manufactured article.

European Patent Application EP 691,218 relates to a tire component for a pneumatic tire comprising a reinforced vulcanizable composition, said composition including a vulcanizable elastomeric matrix material having dispersed therein an effective reinforcing amount of a partially oriented fibres having a modulus of less than 10 GPa, preferably less than 6 GPa. As an alternative embodiment, a tire component may be reinforced with a mixture of a partially oriented fibres and fibrillated pulp fibres (e.g. Kevlar® pulp). The partially oriented fibres may comprise as specific examples, polyamides, polyesters, polyolefins, and a polymer selected from the group consisting of nylon 6, nylon 46, nylon 66, polyethylene, polypropylene, polyethylene-terephthalate (PET). The above mentioned reinforced vulcanizable composition is said to have an improved stiffness without negatively affecting its remaining properties such as, for example, hysteresis and fatigue endurance.

International Patent Application WO 00/24596 in the name of the Applicant relates to a tire with an elastomeric intermediate layer disposed between the tread band and the belted plies wherein the elastomeric intermediate layer is made of a fibre-reinforced material. Said elastomeric intermediate layer may be reinforced with short reinforcing fibres such as, for example, aramide fibres (i.e. Kevlar® pulp) to improve its modulus of elasticity, among other mechanical properties.

Other ways are also known to improve mechanical properties of crosslinked elastomeric compositions.

For example, U.S. Pat. No. 6,230,773 relates to a tire having at least one crescent-shaped rubber composition as an insert in its sidewall region, said sidewall insert including a rubber composition comprising at least one diene-based elastomer, carbon black and, optionally, silica and at least one of 3,3'-dithiodipropionic acid, benzoic acid and salicylic acid. Said sidewall insert has a Shore A hardness at 100° C. in a range of about 65 to about 85, a 100 percent Modulus in a range of about 3.5 to about 10 MPa, an E' at 60° C. value in a range of about 2 to about 20 MPa and a Tan delta value at 60° C. in a range of about 0.03 to about 0.15. It is said that, the utilization of the above reported acid, in particular the 3,3'-dithiodipropionic acid, is significant in order to enhance the stiffness of the sulfur crosslinked elastomeric composition of the insert as well as to endeavor to substantially maintain a relatively low hysteresis.

Moreover, attempts have been made in the art to identify compounds which are able not only to prevent atmospheric attack to crosslinked elastomeric compositions, in particular to those used in tire's manufacturing, more in particular to those used in manufacturing tire's structural elements which are exposed to atmospheric conditions, such as tire's sidewalls, but also to impart a desirable appearance to the outer surface of said crosslinked elastomeric compositions.

For example, U.S. Pat. No. 6,598,632 relates to a tire the sidewalls of which comprises a vulcanized rubber composition including between 0.5 phr and 10 phr (weight parts per hundred parts of rubber) of at least one polymer which comprises an oxy group defined by the formula —O— and, linked to the one side of the oxy group, at least one polyoxyalkylene block according to the formula $(C_nH_{2n}O)_x$, where n is equal to 2 or 3 and x is equal to from 2 through 15 and the at least one block is linked to a hydrogen atom at the chain end, so that the hydrogen atom forms an alcohol function with the terminal oxygen atom of the block. The abovementioned sidewalls are said to have an uniform black appearance which is durable and therefore significantly enhances aesthetic appearance of the tires. Moreover, said sidewalls are said to have good mechanical properties.

SUMMARY OF THE INVENTION

The Applicant has noticed that an improvement of mechanical properties, in particular in terms of tensile modulus and dynamic elastic modulus, of the crosslinked elastomeric compositions, often causes a decrease on their fatigue resistance. Consequently, said elastomeric compositions are not very suitable for tire's structural elements such as, for example, tire's sidewalls, which are usually subjected to stress under their normal operating conditions. On the other end, it is well known in the art that, the improvement of the dynamic elastic modulus go along with a better handling of the tire, in particular when the crosslinked elastomeric composition with an improved dynamic elastic modulus is used in tire's sidewalls.

Moreover, sometimes, said improvement may also cause an increase of the hysteresis values of the crosslinked elastomeric compositions. Too high hysteresis values have to be prevented, in order to avoid both a too high rolling resistance and, in particular in the case of inner structural element of a tire (such as, for example, tire's sidewalls) a too high operating temperatures which may lead to a degradation of the elastomeric compositions with a consequent decrease of their mechanical properties and a possible tire's failure during use of the same.

Consequently, the Applicant has faced the problem of providing crosslinked elastomeric compositions having both improved mechanical properties, in particular in terms of dynamic elastic modulus, and a satisfactory fatigue resistance.

The Applicant has now found that it is possible to obtain crosslinkable elastomeric compositions that may be advantageously used in the production of crosslinked manufactured products, in particular in the manufacturing of tires, more in particular in the manufacturing of sidewalls, sidewall inserts, bead fillers, tread underlayers, tread base, by adding to the crosslinkable elastomeric compositions at least one modified polycarboxylate as defined hereinbelow.

The crosslinked elastomeric compositions so obtained show improved mechanical properties, in particular in terms of dynamic elastic modulus and good fatigue resistance, in particular in terms of flexural fatigue resistance. More in particular, said crosslinked elastomeric compositions show an improved dynamic elastic modulus and a substantially unchanged tensile modulus, in particular tensile modulus at 300% elongation, said result being obtained without observing undesired effects on their remaining properties (i.e. viscosity, hysteresis, breaking properties, adhesion properties).

Moreover, the Applicant has also found that said modified polycarboxylate improves the ozone resistance of said crosslinked elastomeric compositions. As a matter of fact, the use of said modified polycarboxylate allows to reduce or even to avoid the use of the antiozonants which are designed to slow down the formation and propagation of cracks under static and dynamic stressing conditions in the presence of ozone (e.g. p-phenylenediamines), and/or of the waxes which are also commonly used to provide additional static ozone protection, of the crosslinked elastomeric compositions (in particular, of those used for making sidewalls). The use of said modified polycarboxylate allow to avoid the staining and discoloration problems which normally occur, in particular in tire's sidewalls, when the above antiozonants and waxes are used.

According to a first aspect, the present invention relates to a tire comprising at least one structural element including a crosslinked elastomeric material obtained by crosslinking a crosslinkable elastomeric composition comprising:

(a) an amount higher than or equal to 30 phr, preferably of from 40 phr to 100 phr, of at least one polyisoprene rubber;
(b) an amount lower than or equal to 70 phr, preferably of from 0 phr to 60 phr, of at least one diene elastomeric polymer other than the polyisoprene rubber (a);
(c) an amount higher than or equal to 30 phr, preferably of from 40 phr to 120 phr, of at least one carbon black reinforcing filler;
(d) an amount of from 0.2 phr to 10 phr, preferably of from 1 phr to 5 phr, of at least one copolymer of at least one ethylenically unsaturated carboxylic acid or a derivative thereof with at least one ethylenically unsaturated monomer containing at least one polyoxyalkylene side chain.

For the purposes of the present description and of the claims which follow, the term "phr" means the parts by weight of a given component of the crosslinkable elastomeric composition per 100 parts by weight of the elastomeric polymer(s).

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

According to one preferred embodiment, the tire comprises:
a carcass structure of a substantially toroidal shape, having opposite lateral edges associated with respective right-hand and left-hand bead structures, said bead structures comprising at least one bead core and at least one bead filler;
a belt structure applied in a radially external position with respect to said carcass structure;
a tread band radially superimposed on said belt structure;
a pair of sidewalls applied laterally on opposite sides with respect to said carcass structure;
wherein said structural element is a sidewall.

According to a further preferred embodiment, said structural element is a sidewall insert. Said sidewall insert is usually placed in a position axially internal with respect to the sidewall and radially extends for a length between the bead structure and the tread lateral edge. Said sidewall insert is usually used in the case of extended mobility tires such as, for example, run flat tires.

According to a further preferred embodiment, said structural element is a tread underlayer. Usually, said tread underlayer is a layer of a crosslinked elastomeric material applied in a radially inner position with respect to said tread band.

According to a further preferred embodiment, said structural element is a tread base. As a matter of fact, said tread band may be of cap and base construction and comprises a radially inner layer or tread base and a radially outer layer or tread cap. Preferably, said radially inner layer or tread base has a thickness of at least 10%, preferably of from 20% to 70%, with respect to the total thickness of the tread band.

Preferably, said structural, element has a dynamic elastic modulus (E'), measured at 70° C., not lower than 3 MPa, more preferably of from 4 MPa to 10 MPa.

Preferably, said structural element has a tensile modulus at 300% elongation (300% Modulus) not higher than 12 MPa, preferably of from 5 MPa to 9 MPa.

Preferably, said structural element has a IRHD hardness, measured at 23° C. not lower than 20, more preferably of from 50 to 70.

The tensile modulus may be measured according to Standard ISO 37:1994. The dynamic elastic modulus (E') may be measured using an Instron dynamic device in the traction-compression mode. The IRHD hardness may be measured according to Standard ISO 48:1994. Further details regarding the above measurement methods will be given in the examples which follow.

According to a further aspect, the present invention relates to a crosslinkable elastomeric composition comprising:
(a) an amount higher than or equal to 30 phr, preferably of from 40 phr to 100 phr, of at least one polyisoprene rubber;

(b) an amount lower than or equal to 70 phr, preferably of from 0 phr to 60 phr, of at least one diene elastomeric polymer other than the polyisoprene rubber (a);

(c) an amount higher than or equal to 30 phr, preferably of from 40 phr to 120 phr, of at least one carbon black reinforcing filler;

(d) an amount of from 0.2 phr to 10 phr, preferably of from 1 phr to 5 phr, of at least one copolymer of at least one ethylenically unsaturated carboxylic acid or a derivative thereof with at least one ethylenically unsaturated monomer containing at least one polyoxyalkylene side chain.

According to one preferred embodiment, said crosslinkable elastomeric composition may further comprises (e) at least one polyoxyalkylene glycol in an amount of from 0 phr to 10 phr, preferably of from 0.5 phr to 5 phr.

According to a further aspect, the present invention relates to a crosslinked manufactured article obtained by crosslinking the crosslinkable elastomeric composition above reported.

According to one preferred embodiment, the polyisoprene rubber (a) may be selected from natural or synthetic polyisoprene rubber, preferably from natural or synthetic cis-1,4-polyisoprene rubber, synthetic 3,4-polyisoprene rubber, more preferably from natural cis-1,4-polyisoprene rubber (natural rubber).

According to one preferred embodiment, the diene elastomeric polymer (b) other than the polyisoprene rubber (a) may be selected from those commonly used in sulfur-crosslinkable elastomeric compositions, that are particularly suitable for producing tires, that is to say from elastomeric polymers or copolymers with an unsaturated chain having a glass transition temperature ($T_g$) generally below 20° C., preferably in the range of from 0° C. to −110° C. These polymers or copolymers may be of natural origin or may be obtained by solution polymerization, emulsion polymerization or gas-phase polymerization of one or more conjugated diolefins, optionally blended with at least one comonomer selected from monovinylarenes and/or polar comonomers in an amount of not more than 60% by weight.

The conjugated diolefins generally contain from 4 to 12, preferably from 4 to 8 carbon atoms, and may be selected, for example, from the group comprising: 1,3-butadiene, 2,3-dimethyl-1,3-butadiene, 1,3-pentadiene, 1,3-hexadiene, 3-butyl-1,3-octadiene, 2-phenyl-1,3-butadiene, or mixtures thereof. 1,3-Butadiene is particularly preferred.

Monovinylarenes which may optionally be used as comonomers generally contain from 8 to 20, preferably from 8 to 12 carbon atoms, and may be selected, for example, from: styrene; 1-vinylnaphthalene; 2-vinylnaphthalene; various alkyl, cycloalkyl, aryl, alkylaryl or arylalkyl derivatives of styrene such as, for example, α-methylstirene, 3-methylstirene, 4-propylstirene, ±4-cyclohexylstirene, 4-dodecylstirene, 2-ethyl-4-benzylstirene, 4-p-tolylstirene, 4-(4-phenylbutyl)stirene, or mixtures thereof. Stirene is particularly preferred.

Polar comonomers which may optionally be used may be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile, or mixtures thereof.

Preferably, the diene elastomeric polymer (b) may be selected, for example, from: polybutadiene (in particular, polybutadiene with a high 1,4-cis content), optionally halogenated isoprene/isobutene copolymers, 1,3-butadiene/acrylonitrile copolymers, stirene/1,3-butadiene copolymers, stirene/isoprene/1,3-butadiene copolymers, stirene/1,3-butadiene/acrylonitrile copolymers, or mixtures thereof. Polybutadiene (in particular, polybutadiene with a high 1,4-cis content, usually higher than 90%, and a low vinyl content, usually lower than 5%), or mixtures thereof, are particularly preferred. Preferably, said polybutadiene is present in the crosslinkable elastomeric composition above reported in an amount of from 30 phr to 70 phr, more preferably of from 40 phr to 60 phr.

The above reported crosslinkable elastomeric composition may optionally comprise at least one elastomeric polymer of one or more monoolefins with an olefinic comonomer or derivatives thereof (b'). The monoolefins may be selected from: ethylene and α-olefins generally containing from 3 to 12 carbon atoms, such as, for example, propylene, 1-butene, 1-pentene, 1-hexene, 1-octene, or mixtures thereof. The following are preferred: copolymers between ethylene and an α-olefin, optionally with a diene; isobutene homopolymers or copolymers thereof with small amounts of a diene, which are optionally at least partially halogenated. The diene optionally present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

The above reported crosslinkable elastomeric composition may optionally comprise at least one polyisoprene rubber and/or at least one diene elastomeric polymer which are functionalized by reaction with suitable terminating agents or coupling agents. In particular, the diene elastomeric polymers obtained by anionic polymerization in the presence of an organometallic initiator (in particular an organolithium initiator) may be functionalized by reacting the residual organometallic groups derived from the initiator with suitable terminating agents or coupling agents such as, for example, imines, carbodiimides, alkyltin halides, substituted benzophenones, alkoxysilanes or aryloxysilanes (see, for example, European Patent EP 451,604, or U.S. Pat. No. 4,742,124 and U.S. Pat. No. 4,550,142).

According to one preferred embodiment, the carbon black reinforcing filler (c) may be selected from those having a surface area of not less than 20 m²/g (determined by CTAB absorption as described in Standard ISO 6810:1995).

According to one preferred embodiment said copolymer of at least one ethylenically unsaturated carboxylic acid or a derivative thereof with at least one ethylenically unsaturated monomer containing at least one polyoxyalkylene side chain (d) may be selected from compounds having the following general formula (I):

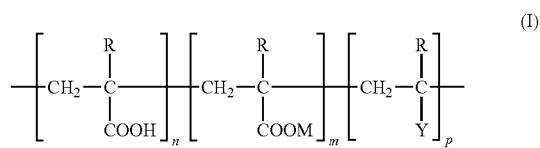

wherein:
R represents a hydrogen atom or a linear or branched $C_1$-$C_4$ alkyl group, preferably a methyl group;
M represents a monovalent or a divalent cation, preferably: an alkali metal cation, more preferably sodium or potassium;

an alkaline-earth metal cation, more preferably calcium;
an ammonium cation having formula $N(R_1)_4$ wherein $R_1$ groups, which may be equal or different from each other, are selected from: hydrogen atoms, linear or branched $C_1$-$C_{18}$ alkyl groups, $C_6$-$C_{18}$ aryl groups, $C_1$-$C_{21}$ arylalkyl or alkylaryl groups, more preferably $NH_4$;
a zinc cation;
n is an integer of from 0 to 20, preferably of from 1 to 10, extremes included;
m and p, which may be equal or different from each other, are an integer of from 1 to 20, preferably of from 2 to 10, extremes included;
Y represents one of the groups having the following general formulae (II), (III) or (IV):

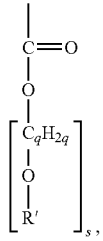

(II)

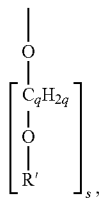

(III)

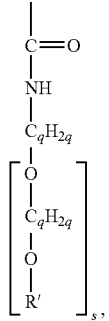

(IV)

wherein:
R has the same meanings as above reported;
R' represents a hydrogen atom; a linear or branched $C_1$-$C_{10}$ alkyl group, preferably a methyl group; a R"—$SO_3M$ group, wherein R" represents a linear or branched $C_2$-$C_{10}$ alkylene group, preferably a methylene group, and M has the same meanings as above reported;
q is an integer of from 1 to 10, preferably of from 1 to 5, extremes included;
s is an integer of from 1 to 100, preferably of from 4 to 50, extremes included.
According, to one preferred embodiment, said copolymer of at least one ethylenically unsaturated carboxylic acid or a derivative thereof with at least one ethylenically unsaturated monomer containing at least one polyoxyalkylene side chain (d) has a weight-average molecular weight (Mw) of from 500 to 100,000, preferably of from 1,000 to 50,000, more preferably of from 2,000 to 30,000. Said weight average molecular weight ($M_w$) may be determined according to known techniques such as, for example, by gel permeation chromatography (GPC).

The copolymer of at least one ethylenically unsaturated carboxylic acid or a derivative thereof with at least one ethylenically unsaturated monomer containing at least one polyoxyalkylene side chain (d) above reported may be obtained by processes known in the art. For example, said copolymer may be obtained by the free-radical polymerization of about 1 wt % to 99 wt % of at least one unsaturated monocarboxylic or dicarboxylic acid or a derivative thereof (such as, for example, (meth)acrylic acid, maleic acid, maleic anhydride), with about 99 wt % to 1 wt % of at least one compound having the following general formula (V):

(V)

wherein R and Y have the same meanings as above reported.
The copolymers so obtained may be further reacted with alkali metal hydroxides, alkaline-earth metal hydroxides, zinc hydroxide, or ammonium compounds.

Said copolymers may be terminated with hydrogen atoms or residues of the polymerization iniziators usually used such as, for example, peroxides, persulfates, azo-type iniziators.

Further details about the processes for producing said copolymers may be found, for example, in International Patent Application WO 03/106369, in U.S. Pat. Nos. 5,798,425 and 5,362,324, or in United States Patent Publication US 2003/0144384.

Examples of copolymers of at least one ethylenically unsaturated carboxylic acid or a derivative thereof with at least one ethylenically unsaturated monomer containing at least one polyoxyalkylene side chain (d) which may be used in the present invention and which are currently commercially available are the products Melflux® from Degussa (in particular, Melflux® PP100, Melflux® VP2651, Melflux® 1641), Narlex® from Alco Chemical (in particular, Narlex® D36, Narlex® D38), Peramin® Conpac S149 from Perstorp.

As reported above, said crosslinkable elastomeric composition may further comprise (e) at least one polyoxyalkylene glycol. Preferably, said polyoxyalkylene glycol may be selected, for example, from polyoxyethylene glycol, polyoxypropylene glycol, or mixtures thereof. Polyoxyethylene glycol is particularly preferred.

At least one additional reinforcing filler may advantageously be added to the above reported crosslinkable elastomeric composition, in an amount generally of from 0 phr to 120 phr, preferably of from 20 phr to 90 phr. The reinforcing filler may be selected from those commonly used for crosslinked manufactured articles, in particular for tires, such as, for example, silica, alumina, aluminosilicates, calcium carbonate, kaolin, or mixtures thereof.

The silica which may be used in the present invention may generally be a pyrogenic silica or, preferably, a precipitated silica, with a BET surface area (measured according to ISO standard 5794/1) of from 50 m²/g to 500 m²/g, preferably of from 70 m²/g to 200 m²/g.

When a reinforcing filler comprising silica is present, the crosslinkable elastomeric composition may advantageously incorporate a silane coupling agent capable of interacting with the silica and of linking it to the elastomeric polymer during the vulcanization.

Coupling agents that are preferably used are those based on silane which may be identified, for example, by the following structural formula (VI):

$(R_2)_3Si-C_tH_{2t}-X$ (VI)

wherein the groups $R_2$, which may be equal or different from each other, are selected from: alkyl, alkoxy or aryloxy groups or from halogen atoms, on condition that at least one of the groups $R_2$ is an alkoxy or aryloxy group; t is an integer between 1 and 6 inclusive; X is a group selected from: nitroso, mercapto, amino, epoxide, vinyl, imide, chloro, $-(S)_u$ $C_tH_{2t}-Si-(R_2)_3$ or $-S-COR_2$ in which u and t are integers of from 1 to 6 extremes included and the groups $R_2$ are defined as reported above.

Among the coupling agents that are particularly preferred are bis(3-triethoxysilylpropyl) tetrasulphide and bis(3-triethoxysilylpropyl) disulphide. Said coupling agents may be used as such or as a suitable mixture with an inert filler (for example carbon black) so as to facilitate their incorporation into the crosslinkable elastomeric composition.

The crosslinkable elastomeric composition above reported may be vulcanized according to known techniques, in particular with sulfur-based vulcanizing systems commonly used for elastomeric polymers. To this end, in the composition, after one or more steps of thermomechanical processing, a sulfur-based vulcanizing agent is incorporated together with vulcanization accelerators. In the final processing step, the temperature is generally kept below 120° C. and preferably below 100° C., so as to avoid any unwanted pre-crosslinking phenomena.

The vulcanizing agent most advantageously used is sulfur, or molecules containing sulfur (sulfur donors), with accelerators and activators known to those skilled in the art.

Activators that are particularly effective are zinc compounds, and in particular ZnO, $ZnCO_3$, zinc salts of saturated or unsaturated fatty acids containing from 8 to 18 carbon atoms, such as, for example, zinc stearate, which are preferably formed in situ in the elastomeric composition from ZnO and fatty acid, and also BiO, PbO, $Pb_3O_4$, $PbO_2$, or mixtures thereof.

Accelerators that are commonly used may be selected from: dithiocarbamates, guanidine, thiourea, thiazoles, sulphenamides, thiurams, amines, xanthates, or mixtures thereof.

Said crosslinkable elastomeric composition may comprise other commonly used additives selected on the basis of the specific application for which the composition is intended. For example, the following may be added to said crosslinkable elastomeric composition: antioxidants, anti-ageing agents, plasticizers, adhesives, antiozonants (in particular of the p-phenylenediamine type), waxes, modifying resins, fibres (for example Kevlar® pulp), or mixtures thereof.

Preferably, according to the present invention, as already reported above, the antiozonants and/or the waxes may be avoided or they may be used in a low amount, preferably lower than 5 phr. Preferably, said antiozonants are added to the crosslinkable elastomeric compositions in an amount of from 0 phr to 3 phr. Preferably, said waxes are added to the crosslinkable elastomeric compositions in an amount of from 0 phr to 3 phr.

For the purpose of further improving the processability, a plasticizer generally selected from mineral oils, vegetable oils, synthetic oils, or mixtures thereof, such as, for example, aromatic oil, naphthenic oil, phthalates, soybean oil, or mixtures thereof, may be added to said crosslinkable elastomeric composition. The amount of plasticizer generally ranges of from 0 phr to 70 phr, preferably of from 5 phr to 30 phr.

The above reported crosslinkable elastomeric composition may be prepared by mixing together the elastomeric base components, the carbon black reinforcing filler and the copolymer (d) above reported, with the other reinforcing fillers and the other additives optionally present, according to techniques known in the art. The mixing may be carried out, for example, using an open mixer of open-mill type, or an internal mixer of the type with tangential rotors (Banbury) or with interlocking rotors (Intermix), or in continuous mixers of Ko-Kneader type (Buss), or of co-rotating or counter-rotating twin-screw type.

The present invention will now be illustrated in further detail by means of a number of illustrative embodiments, with reference to the attached FIG. 1-4 which are a view in cross section of a portion of a tire made according to the invention.

DETAILED DESCRIPTION OF THE INVENTION

Figure 1:
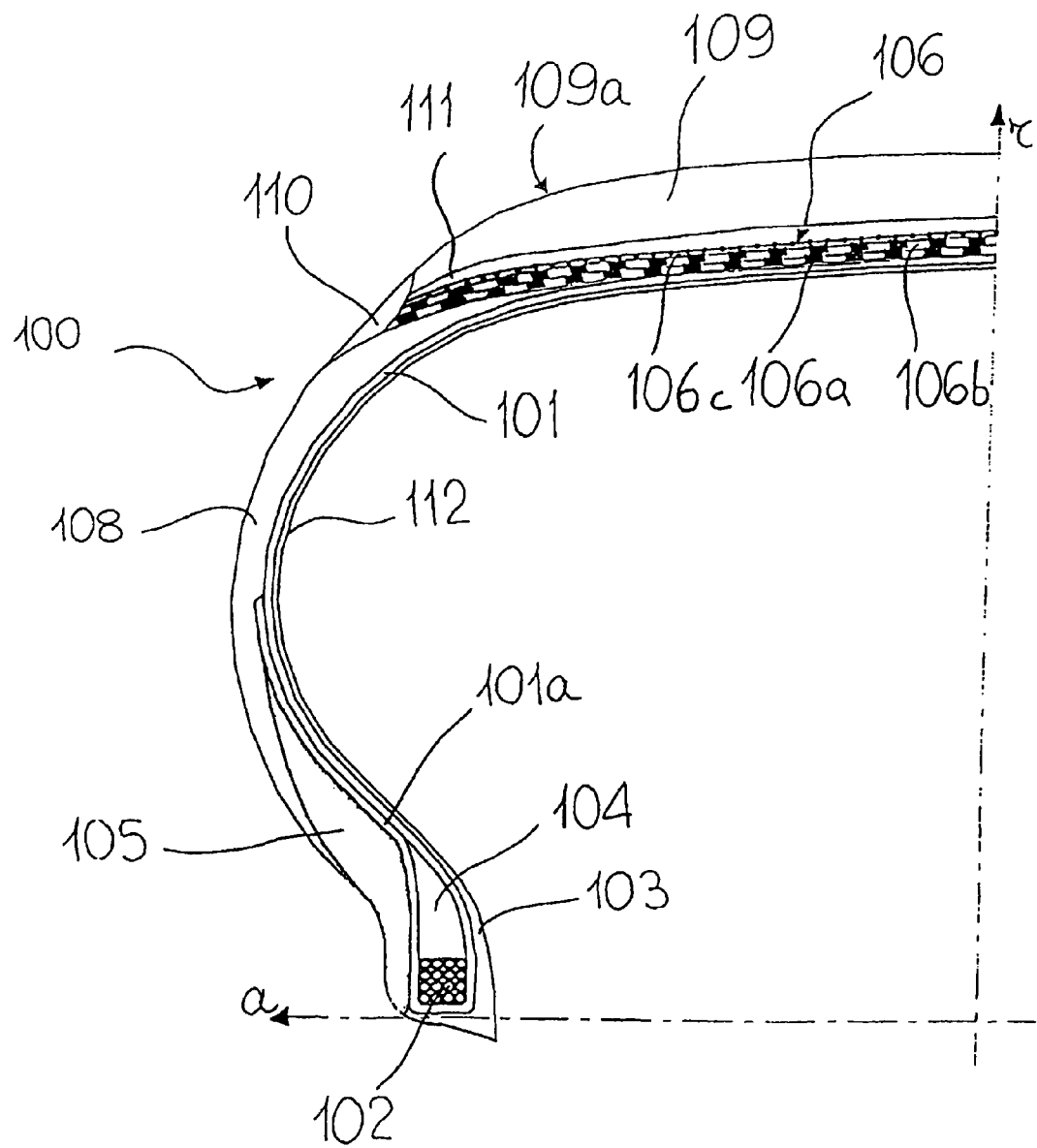
FIG. 1 is a view in cross section of a portion of a tire made according to the invention.

"a" indicates an axial direction and "r" indicates a radial direction. For simplicity, FIG. 1 shows only a portion of the tire, the remaining portion not represented being identical and symmetrically arranged with respect to the radial direction "r".

The tire (100) comprises at least one carcass ply (101), the opposite lateral edges of which are associated with respective bead structures comprising at least one bead core (102) and at least one bead filler (104). The association between the carcass ply (101) and the bead core (102) is achieved here by folding back the opposite lateral edges of the carcass ply (101) around the bead core (102) so as to form the so-called carcass back-fold (101a) as shown in FIG. 1.

Alternatively, the conventional bead core (102) may be replaced with at least one annular insert formed from rubberized wires arranged in concentric coils (not represented in FIG. 1) (see, for example, European Patent Applications EP 928,680 and EP 928,702). In this case, the carcass ply (101) is not back-folded around said annular inserts, the coupling being provided by a second carcass ply (not represented in FIG. 1) applied externally over the first.

The carcass ply (101) generally consists of a plurality of reinforcing cords arranged parallel to each other and at least partially coated with a layer of a crosslinked elastomeric composition. These reinforcing cords are usually made of textile fibres, for example rayon, nylon or polyethylene terephthalate, or of steel wires stranded together, coated with a metal alloy (for example copper/zinc, zinc/manganese, zinc/molybdenum/cobalt alloys and the like).

The carcass ply (101) is usually of radial type; i.e. it incorporates reinforcing cords arranged in a substantially perpendicular direction relative to a circumferential direction. The core (102) is enclosed in a bead (103), defined along an inner circumferential edge of the tire (100), with which the tire engages on a rim (not represented in FIG. 1) forming part of a vehicle wheel. The space defined by each carcass back-fold (101a) contains a bead filler (104) which may be made according to the present invention, wherein the bead core (102) is embedded. An antiabrasive strip (105) is usually placed in an axially external position relative to the carcass back-fold (101a).

A belt structure (106) is applied along the circumference of the carcass ply (101). In the particular embodiment in FIG. 1, the belt structure (106) comprises two belt strips (106a, 106b) which incorporate a plurality of reinforcing cords, typically metal cords, which are parallel to each other in each strip and intersecting with respect to the adjacent strip, oriented so as to form a predetermined angle relative to a circumferential direction. On the radially outermost belt strip (106b) may optionally be applied at least one zero-degree reinforcing layer (106c), commonly known as a "0° belt", which generally incorporates a plurality of reinforcing cords, typically textile cords, arranged at an angle of a few degrees relative to a circumferential direction, and coated and welded together by means of a crosslinked elastomeric composition.

A side wall (108), which may be made according to the present invention, is also applied externally onto the carcass ply (101), this side wall extending, in an axially external position, from the bead (103) to the end of the belt structure (106).

A tread band (109), whose lateral edges are connected to the side walls (108), is applied circumferentially in a position radially external to the belt structure (106). Externally, the tread band (109) has a rolling surface (109a) designed to come into contact with the ground. Circumferential grooves which are connected by transverse notches (not represented in FIG. 1) so as to define a plurality of blocks of various shapes and sizes distributed over the rolling surface (109a) are generally made in this surface (109a), which is represented for simplicity in FIG. 1 as being smooth.

A tread underlayer (111), which may be made according to the present invention, is placed between the belt structure (106) and the tread band (109).

As represented in FIG. 1, the tread underlayer (111) may have uniform thickness.

Alternatively, the tread underlayer (111) may have a variable thickness in the transversal direction. For example, the thickness may be greater near its outer edges than at a central zone.

In FIG. 1, said tread underlayer (111) extends over a surface substantially corresponding to the surface of development of said belt structure (106). Alternatively, said tread underlayer (111) extends only along at least one portion of the development of said belt structure (106), for instance at opposite side portions of said belt structure (106) (not represented in FIG. 1).

A strip made of elastomeric material (110), commonly known as a "mini-side wall", may optionally be present in the connecting zone between the side walls (108) and the tread band (109), this mini-side wall generally being obtained by co-extrusion with the tread band and allowing an improvement in the mechanical interaction between the tread band (109) and the side walls (108). Alternatively, the end portion of the side wall (108) directly covers the lateral edge of the tread band (109).

In the case of tubeless tires, a rubber layer (112) generally known as a liner, which provides the necessary impermeability to the inflation air of the tire, may also be provided in an inner position relative to the carcass ply (101).

Figure 2:
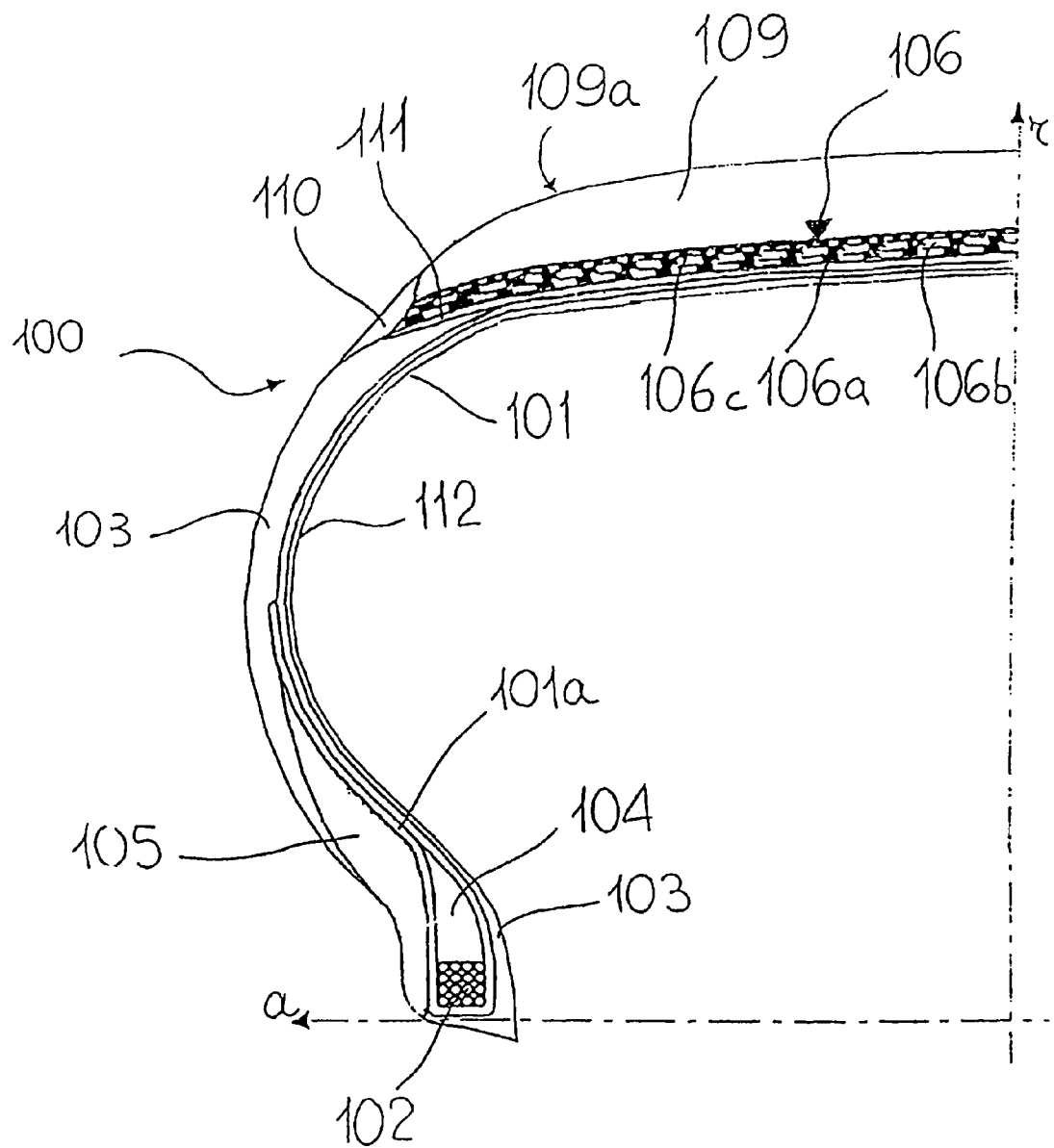
FIG. 2 is a view in cross section of a portion of another tire made according to the invention.

FIG. 2, shows a tire (100) having a structure as described in FIG. 1 where the tread underlayer (111), which may be made according to the present invention, is placed between the belt structure (106) and the carcass ply (101).

Figure 3:
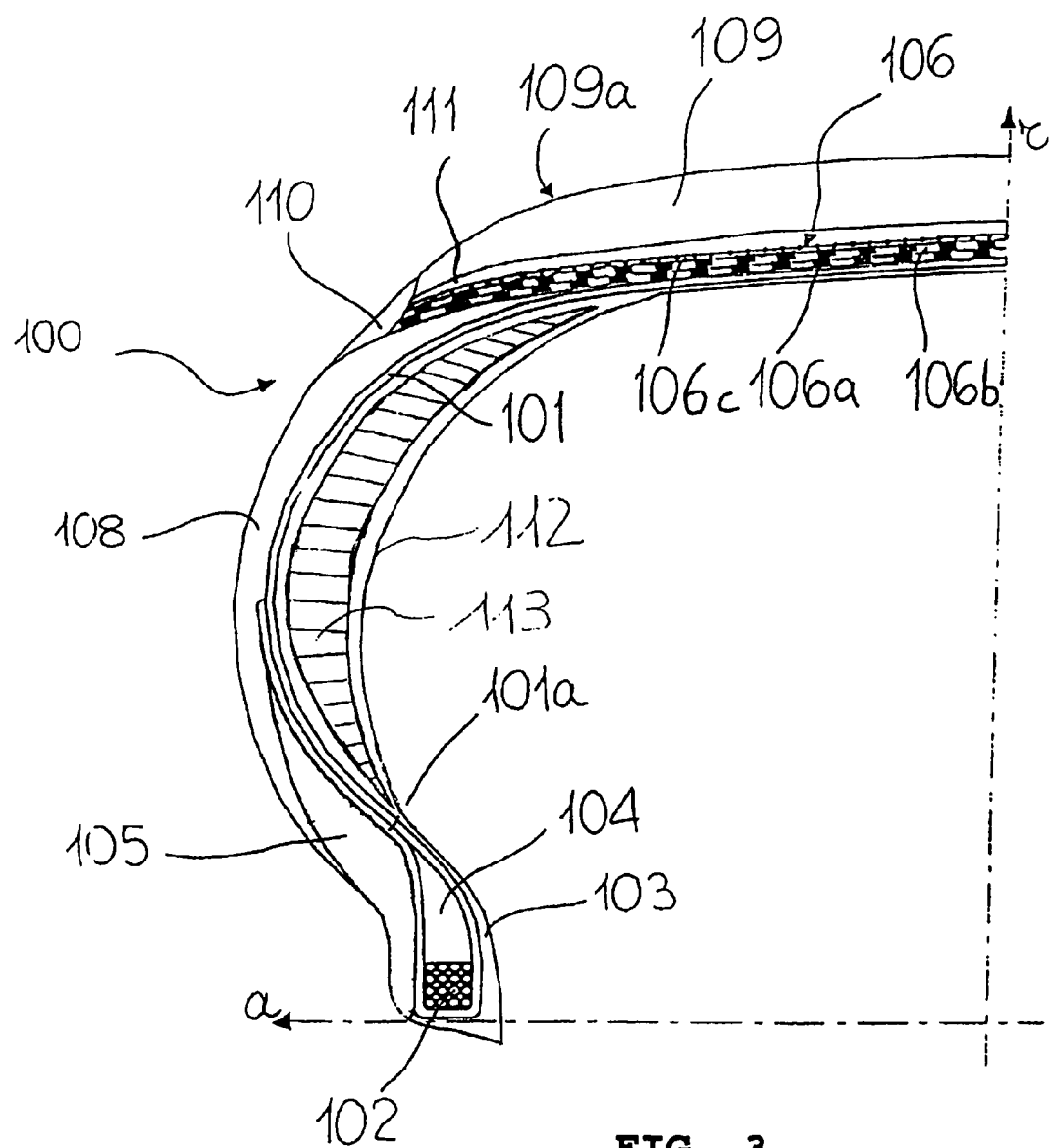
FIG. 3 is a view in cross section of a portion of still another tire made according to the invention.

FIG. 3, shows a tire (100) having a structure as described, in FIG. 1 where a sidewall insert (113), which may be made according to the present invention, which radially extends from a position corresponding to the bead structure to a position corresponding to a tread lateral edge, is placed in an axially internal position with respect to the carcass ply: for example, as represented in FIG. 3, said sidewall insert is placed between the carcass ply (101) and the liner (112). Alternatively, in the case in which more carcass plies are present, a sidewall insert (113) is placed between two of said carcass plies (not represented in FIG. 3.) Alternatively, a sidewall insert is placed between the carcass ply and the side wall (not represent in FIG. 3). More than one sidewall insert may be present as disclosed, for example, in U.S. Pat. No. 5,238,040 or in European Patent EP 943,466.

Figure 4:
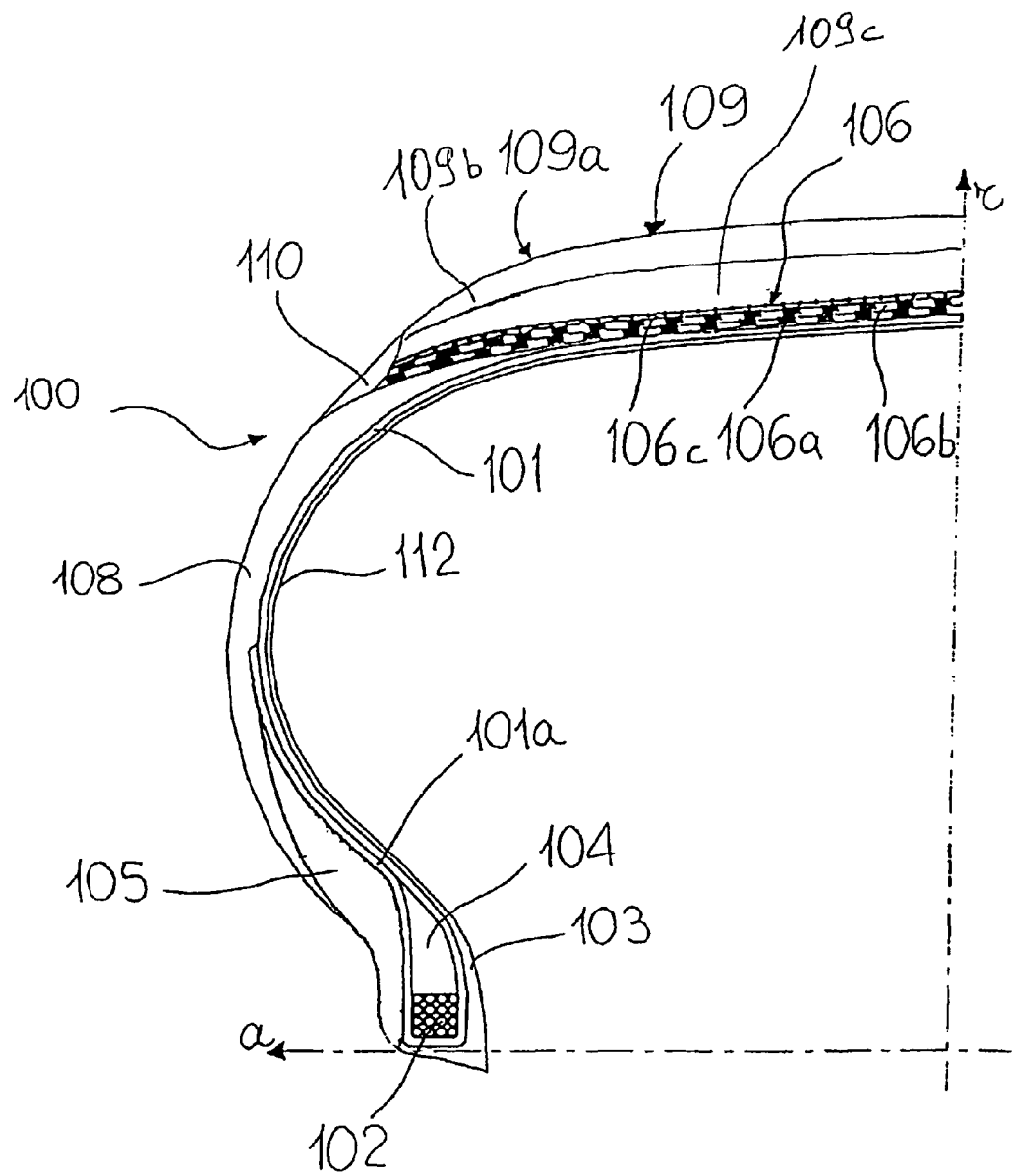
FIG. 4 is a view in cross section of a portion of another tire made according to the invention.

FIG. 4, shows a tire (100) having a structure as described in FIG. 1 where a tread band (109) is of cap and base construction. More in particular, said tread band (109) comprises a radially inner layer or tread base (109c) and a radially outer layer or tread cap (109b): the tread base (109c) may be made according to the present invention.

As represented in FIG. 4, the tread base (109c) has a uniform thickness. In any case, the thickness of the tread base (109c) may also be not uniform but, for example, greater near its outer edges and/or at the central zone thereof.

The process for producing the tire according to the present invention may be carried out according to techniques and using apparatus that are known in the art, as described, for example, in European Patents EP 199,064, or in U.S. Pat. Nos. 4,872,822 and 4,768,937, said process including at least one stage of manufacturing the crude tire and at least one stage of vulcanizing this tire.

More particularly, the process for producing the tire comprises the steps of preparing, beforehand and separately from each other, a series of semi-finished products corresponding to the various structural elements of the tire (carcass plies, belt structure, bead wires, fillers, sidewalls and tread band) which are then combined together using a suitable manufacturing machine. Next, the subsequent vulcanization step welds the abovementioned semi-finished products together to give a monolithic block, i.e. the finished tire.

The step of preparing the abovementioned semi-finished products will be preceded by a step of preparing and moulding the various crosslikable elastomeric compositions, of which said semi-finished products are made, according to conventional techniques.

The crude tire thus obtained is then passed to the subsequent steps of moulding and vulcanization. To this end, a vulcanization mould is used which is designed to receive the tire being processed inside a moulding cavity having walls which are countermoulded to define the outer surface of the tire when the vulcanization is complete.

Alternative processes for producing a tire or parts of a tire without using semi-finished products are disclosed, for example, in the abovementioned European Patent Applications EP 928,680 and EP 928,702.

The crude tire can be moulded by introducing a pressurized fluid into the space defined by the inner surface of the tire, so as to press the outer surface of the crude tire against the walls of the moulding cavity. In one of the moulding methods widely practised, a vulcanization chamber made of elastomeric material, filled with steam and/or another fluid under pressure, is inflated inside the tire closed inside the moulding cavity. In this way, the crude tire is pushed against the inner walls of the moulding cavity, thus obtaining the desired moulding. Alternatively, the moulding may be carried out without an inflatable vulcanization chamber, by providing inside the tire a toroidal metal support shaped according to the configuration of the inner surface of the tire to be obtained as described, for example, in European Patent EP 1,189,744.

At this point, the step of vulcanizing the crude tire is carried out. To this end, the outer wall of the vulcanization mould is placed in contact with a heating fluid (generally steam) such that the outer wall reaches a maximum temperature generally of from 100° C. to 230° C. Simultaneously, the inner surface of the tire is heated to the vulcanization temperature using the same pressurized fluid used to press the tire against the walls of the moulding cavity, heated to a maximum temperature of from 100° C. to 250° C. The time required to obtain a satisfactory degree of vulcanization throughout the mass of the elastomeric material may vary in general of from 3 min to 90 min and depends mainly on the dimensions of the tire. When the vulcanization is complete, the tire is removed from the vulcanization mould.

The present invention will be further illustrated below by means of a number of preparation examples, which are given for purely indicative purposes and without any limitation of this invention:

EXAMPLES 1-2

Preparation of the Elastomeric Compositions

The elastomeric compositions given in Table 1 were prepared as follows (the amounts of the various components are given in phr).

All the components, except sulfur, retardant (PVI) and accelerator (CBS), were mixed together in an internal mixer (model Pomini PL 1.6) for about 5 min ($1^{st}$ Step). As soon as the temperature reached 145±5° C., the elastomeric composition was discharged. The sulfur, retardant (PVI) and accelerator (CBS), were then added and mixing was carried out in an open roll mixer ($2^{nd}$ Step).

TABLE 1

| | EXAMPLE | |
|---|---|---|
| | 1 (*) | 2 |
| $1^{st}$ STEP | | |
| NR | 50 | 50 |
| BR | 50 | 50 |
| N660 | 50 | 50 |
| Zinc oxide | 3 | 3 |
| Stearic acid | 2 | 2 |
| Microcrystalline wax | 2 | 2 |
| 6-PPD | 2 | 2 |
| Melflux ® PP100 | — | 3 |
| $2^{nd}$ STEP | | |
| CBS | 0.80 | 0.80 |
| PVI | 0.20 | 0.20 |
| Sulfur | 1.80 | 1.80 |

(*): comparative.
NR: natural rubber;
BR: cis-1,4-polybutadiene (Europrene ® Neocis BR40 - Polimeri Europa);
N660: carbon black;
6-PPD: N-(1,3-dimethylbutyl)-N'-phenyl-p-phenylene-diamine;
Melflux ® PP100: copolymer of partially salified (meth)acrylic acid monomers with ethylenically unsaturated monomers containing polyoxyethylene side chains (Degussa);
CBS (accelerator): N-cyclohexyl-2-benzothiazyl sulphenamide (Vulkacit ® CZ - Bayer);
PVI (retardant): N-cyclohexylthiophthalimide (Santogard ® PVI - Monsanto).

The Mooney viscosity ML(1+4) at 100° C. was measured, according to Standard ISO 289-1:1994, on the non-crosslinked elastomeric compositions obtained as described above. The results obtained are given in Table 2.

The static mechanical properties according to Standard ISO 37:1994 as well as hardness in IRHD degrees (at 23° C. and at 100° C.) according to ISO standard 48:1994, were measured on samples of the abovementioned elastomeric compositions vulcanized at 170° C. for 10 min. The results obtained are given in Table 2.

Table 2 also shows the dynamic mechanical properties, measured using an Instron dynamic device in the traction-compression mode according to the following methods. A test piece of the crosslinked elastomeric composition (vulcanized at 170° C. for 10 min) having a cylindrical form (length=25 mm; diameter=12 mm), compression-preloaded up to a 10% longitudinal deformation with respect to the initial length, and kept at the prefixed temperature (23° C. or 70° C.) for the whole duration of the test, was submitted to a dynamic sinusoidal strain having an amplitude of ±3.5% with respect to the length under pre-load, with a 100 Hz frequency. The dynamic mechanical properties are expressed in terms of dynamic elastic modulus (E') and Tan delta (loss factor) values. The Tan delta value is calculated as a ratio between viscous modulus (E") and elastic modulus (E').

Moreover, Table 2 also show the flexural fatigue resistance, at 70° C., according to ISO standard 132:199 (De Mattia test), on samples of the crosslinked elastomeric composition (vulcanized at 170° C. for 10 min), was measured. To this purpose, test pieces were conditioned at room temperature (23° C.) for 16 hours and then subjected to the following measurement:

number of cycles at which the tear starts;
number of cycles at which the complete break of the pieces occurs.

TABLE 2

| | EXAMPLE | |
|---|---|---|
| | 1 (*) | 2 |
| Mooney viscosity ML (1 + 4) | 59 | 60 |
| STATIC MECHANICAL PROPERTIES | | |
| 50% Modulus (Mpa) | 1.06 | 1.09 |
| 100% Modulus (Mpa) | 1.77 | 1.79 |
| 300% Modulus (Mpa) | 8.10 | 7.47 |
| Stress at break (MPa) | 11.49 | 12.07 |
| Elongation at break (%) | 430.2 | 510.5 |
| DYNAMIC MECHANICAL PROPERTIES | | |
| E' (23° C.) | 4.549 | 4.958 |
| E' (70° C.) | 4.102 | 4.703 |
| Tan delta (23° C.) | 0.129 | 0.127 |
| Tan delta (70° C.) | 0.098 | 0.104 |
| IRHD Hardness (23° C.) | 58.0 | 58.8 |
| IRHD Hardness (70° C.) | 55.9 | 57.4 |
| FLEXURAL FATIGUE RESISTANCE (DE MATTIA TEST) | | |
| Start tear (kcycles) | 61,512 | >200,000 |
| Complete break (kcycles) | 92,798 | >200,000 |

(*): comparative.

EXAMPLES 3-4

Preparation of the Elastomeric Compositions

The elastomeric compositions given in Table 3 were prepared as follows (the amounts of the various components are given in phr).

All the components, except sulfur, retardant (PVI) and accelerator (CBS), were mixed together in an internal mixer (model Pomini PL 1.6) for about 5 min ($1^{st}$ Step). As soon as the temperature reached 145±5° C., the elastomeric composition was discharged. The sulfur, retardant (PVI) and accelerator (CBS), were then added and mixing was carried out in an open roll mixer (2$^{nd}$ Step).

TABLE 3

| | EXAMPLE | |
|---|---|---|
| | 3 (*) | 4 |
| 1$^{st}$ STEP | | |
| NR | 50 | 50 |
| BR | 50 | 50 |
| N660 | 50 | 50 |
| Zinc oxide | 3 | 3 |
| Stearic acid | 2 | 2 |
| Microcrystalline wax | 2 | — |
| 6-PPD | 4 | 2 |
| Melflux ® PP100 | — | 3 |
| 2$^{nd}$ STEP | | |
| CBS | 0.80 | 0.80 |
| PVI | 0.20 | 0.20 |
| Sulfur | 1.80 | 1.80 |

(*) comparative.
NR: natural rubber;
BR: cis-1,4-polybutadiene (Europrene ® Neocis BR40 - Polimeri Europa);
N660: carbon black;
6-PPD: N-(1,3-dimethylbutyl)-N'-phenyl-p-phenylene-diamine;
Melflux ® PP100: copolymer of partially salified (meth)acrylic acid monomers with ethylenically unsaturated monomers containing polyoxyethylene side chains (Degussa);
CBS (accelerator): N-cyclohexyl-2-benzothiazyl sulphenamide (Vulkacit ® CZ - Bayer);
PVI (retardant): N-cyclohexylthiophthalimide (Santogard ® PVI - Monsanto).

The Mooney viscosity ML(1+4), the static mechanical properties, the hardness in IRHD degrees, the dynamic mechanical properties and the flexural fatigue resistance, were measured as disclosed in Example 1: the obtained data are given in Table 4.

TABLE 4

| | EXAMPLE | |
|---|---|---|
| | 3 (*) | 4 |
| Mooney viscosity ML (1 + 4) | 49.8 | 52.1 |
| STATIC MECHANICAL PROPERTIES | | |
| 50% Modulus (Mpa) | 1.00 | 1.15 |
| 100% Modulus (Mpa) | 1.50 | 1.90 |
| 300% Modulus (Mpa) | 7.80 | 7.70 |
| Stress at break (MPa) | 12.50 | 11.80 |
| Elongation at break (%) | 470 | 490 |
| DYNAMIC MECHANICAL PROPERTIES | | |
| E' (23° C.) | 4.410 | 4.980 |
| E' (70° C.) | 3.800 | 4.750 |
| Tan delta (23° C.) | 0.120 | 0.125 |
| Tan delta (70° C.) | 0.090 | 0.090 |
| IRHD Hardness (23° C.) | 57.0 | 59.5 |
| IRHD Hardness (70° C.) | 55.0 | 58.0 |
| FLEXURAL FATIGUE RESISTANCE (DE MATTIA TEST) | | |
| Start tear (kcycles) | 115,940 | >200,000 |
| Complete break (kcycles) | 176,632 | >200,000 |

(*): comparative.

Furthermore, samples of the above disclosed elastomeric compositions were subjected to ozone test (both static and dynamic).

Static Ozone Test

Test pieces of the above disclosed crosslinked elastomeric compositions (vulcanized at 170° C. for 10 min) having the following dimensions 90 mm×180 mm×3 mm were obtained and subjected to traction up to 20% strain. Then, the test pieces under the above traction were fixed to plates with an adhesive in order to maintain said traction.

The plates so obtained were placed in a test chamber apparatus Mod. 703, made by Hampden, in order to evaluate the degradation by ozone operating at the following conditions:
ozone concentration: 50±5 pphm (parts per hundred millions);
temperature: 50±2° C.;
exposure time: 70 hours.

After 70 hours at the conditions reported above, the test pieces were examined visually in order to determine the presence of cracks: none of the test pieces showed any detectable cracks.

Dynamic Ozone Test

The dynamic ozone test was carried out as follow.

Test pieces of the above disclosed crosslinked elastomeric compositions (vulcanized at 170° C. for 10 min) having the following dimensions: 30 mm×8 mm×1 mm were positioned inside a bell-glass wherein a ozonized air [ozone concentration equal to 10±2 pphm (parts per hundred millions)] was conveyed and were dynamically continuously subjected to traction from 0% to 30% of strain. The test was carried out at ambient temperature (23±1° C.).

Every 2 hours (for a total time of 17 hours) at the conditions reported above, the test pieces were examined at the optical microscope (40×) in order to determine the presence of cracks.

The results of said test are expressed by means of an evaluation scale which runs from 0 to 5:
0=no cracks visible with the optical microscope (40×);
5=cracks visible with the optical microscope (40×) and with the naked eye.

After 17 hours, the obtained data are the following:
test piece of Example 3: 1;
test piece of Example 4: 1.

The data above reported clearly show that notwithstanding the decrease of the amount of the antiozonant (6-PPD) and the elimination of the crystalline wax, the crosslinked elastomeric composition according to the present invention (Example 4) shows the same ozone resistance, both static and dynamic, with respect to the crosslinked elastomeric composition containing both the antiozonant (in a higher amount, namely 4 phr) and the wax (Example 3).

EXAMPLES 5-6

Preparation of the Elastomeric Compositions

The elastomeric compositions given in Table 5 were prepared as follows (the amounts of the various components are given in phr).

All the components, except sulfur, retardant (PVI) and accelerator (CBS), were mixed together in an internal mixer (model Pomini PL 1.6) for about 5 min (1$^{st}$ Step). As soon as the temperature reached 145±5° C., the elastomeric composition was discharged. The sulfur, retardant (PVI) and accelerator (CBS), were then added and mixing was carried out in an open roll mixer (2$^{nd}$ Step).

TABLE 5

| | EXAMPLE | |
|---|---|---|
| | 5 | 6 (*) |
| 1st STEP | | |
| NR | 45 | 45 |
| BR | 55 | 55 |
| N660 | 61 | 61 |
| Zinc oxide | 3 | 3 |
| Stearic acid | 2 | 2 |
| Microcrystalline wax | 2 | 2 |
| Aromatic oil | 18 | 18 |
| 6-PPD | 4 | 4 |
| Synperonic ® A4 | — | 2 |
| 2nd STEP | | |
| CBS | 0.70 | 0.70 |
| PVI | 0.10 | 0.10 |
| Sulfur | 1.80 | 1.80 |

(*) comparative.
NR: natural rubber;
BR: cis-1,4-polybutadiene (Europrene ® Neocis BR40 - Polimeri Europa);
N660: carbon black;
6-PPD: N-(1,3-dimethylbutyl)-N'-phenyl-p-phenylene-diamine;
Synperonic ® A4: polyoxyethylene-(4)-synthetic primary $C_{13}/C_{15}$ alcohol (Uniqema);
CBS (accelerator): N-cyclohexyl-2-benzothiazyl sulphenamide (Vulkacit ® CZ - Bayer);
PVI (retardant): N-cyclohexylthiophthalimide (Santogard ® PVI - Monsanto).

The Mooney viscosity ML(1+4), the static mechanical properties, the hardness in IRHD degrees, the dynamic mechanical properties and the flexural fatigue resistance, were measured as disclosed in Example 1: the obtained data are given in Table 6.

TABLE 6

| | EXAMPLE | |
|---|---|---|
| | 5 | 6 (*) |
| Mooney viscosity ML (1 + 4) | 40.0 | 42.1 |
| STATIC MECHANICAL PROPERTIES | | |
| 50% Modulus (Mpa) | 0.76 | 0.70 |
| 100% Modulus (Mpa) | 1.16 | 1.08 |
| 300% Modulus (Mpa) | 5.26 | 4.74 |
| Stress at break (MPa) | 15.50 | 14.80 |
| Elongation at break (%) | 682 | 695 |
| DYNAMIC MECHANICAL PROPERTIES | | |
| E' (23° C.) | 4.429 | 4.118 |
| E' (70° C.) | 3.729 | 3.464 |
| Tan delta (23° C.) | 0.195 | 0.200 |
| Tan delta (70° C.) | 0.175 | 0.158 |
| IRHD Hardness (23° C.) | 52.2 | 50.2 |
| IRHD Hardness (70° C.) | 47.2 | 46.1 |
| FLEXURAL FATIGUE RESISTANCE (DE MATTIA TEST) | | |
| Start tear (kcycles) | 117,000 | 118,000 |
| Complete break (kcycles) | 200,000 | 190,000 |

(*) comparative.

The data above reported clearly show that the use of Synperonic® A4 as disclosed in U.S. Pat. No. 6,598,632 above cited (Example 6) causes a decrease of both the tensile modulus and the dynamic elastic modulus of the crosslinked elastomeric composition so obtained with respect to the crosslinked elastomeric composition without Synperonic® A4 (Example 5).

Furthermore, samples of the above disclosed elastomeric compositions were subjected to ozone test (both static and dynamic) operating as disclosed in Examples 3-4. The obtained data were the following.
STATIC OZONE TEST: one of the test pieces showed any detectable cracks.
Dynamic Ozone Test:
test piece of Example 5: 2;
test piece of Example 4: 3.

The invention claimed is:

1. A tire comprising at least one structural element comprising a crosslinked elastomeric material obtained by crosslinking a crosslinkable elastomeric composition comprising:
    (a) an amount higher than or equal to 30 phr of at least one polyisoprene rubber;
    (b) an amount lower than or equal to 70 phr of at least one diene elastomeric polymer other than the polyisoprene rubber (a);
    (c) an amount higher than or equal to 30 phr of at least one carbon black reinforcing filler; and
    (d) 0.2 phr to 10 phr of at least one copolymer of at least one ethylenically unsaturated carboxylic acid or a derivative thereof with at least one ethylenically unsaturated monomer containing at least one polyoxyalkylene side chain.

2. The tire according to claim 1, wherein said polyisoprene rubber (a) is present in an amount of 40 phr to 100 phr.

3. The tire according to claim 1, wherein said diene elastomeric polymer (b) other than the polyisoprene rubber (a) is present in an amount of 0 phr to 60 phr.

4. The tire according to claim 1, wherein said carbon black (c) is present in an amount of 40 phr to 120 phr.

5. The tire according to claim 1, wherein said copolymer of at least one ethylenically unsaturated carboxylic acid or a derivative thereof with at least one ethylenically unsaturated monomer containing at least one polyoxyalkylene side chain (d) is present in an amount of 1 phr to 5 phr.

6. The tire according to claim 1, comprising:
    a carcass structure of a substantially toroidal shape, having opposite lateral edges associated with respective right-hand and left-hand bead structures, said bead structures comprising at least one bead core and at least one bead filler;
    a belt structure applied in a radially external position with respect to said carcass structure;
    a tread band radially superimposed on said belt structure; and
    a pair of sidewalls applied laterally on opposite sides with respect to said carcass structure,
    wherein said structural element is a sidewall.

7. The tire according to claim 1, wherein said structural element is a sidewall insert.

8. The tire according to claim 1, wherein said structural element is a tread underlayer.

9. The tire according to claim 1, wherein said structural element is a tread base.

10. The tire according to claim 1, wherein said structural element has a dynamic elastic modulus measured at 70° C., not lower than 3 MPa.

11. The tire according to claim 10, wherein said structural element has a dynamic elastic modulus measured at 70° C., of 4 MPa to 10 MPa.

12. The tire according to claim 1, wherein said structural element has a tensile modulus at 300% elongation not higher than 12 MPa.

13. The tire according to claim 12, wherein said structural element has a tensile modulus at 300% elongation of 5 MPa to 9 MPa.

14. The tire according to claim 1, wherein said structural element has an IRHD hardness, measured at 23° C., not lower than 20.

15. The tire according to claim 14, wherein said structural element has an IRHD hardness, measured at 23° C., of 50 to 70.

16. The tire according to claim 1, wherein said polyisoprene rubber (a) is selected from natural or synthetic polyisoprene rubber.

17. The tire according to claim 1, wherein said diene elastomeric polymer (b) other than the polyisoprene rubber (a) has a glass transition temperature below 20° C.

18. The tire according to claim 17, wherein said diene elastomeric polymer (b) is selected from: polybutadiene, optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

19. The tire according to claim 18, wherein said diene elastomeric polymer (b) is polybutadiene.

20. The tire according to claim 19, wherein said polybutadiene is present in said elastomeric crosslinkable composition in an amount of 30 phr to 70 phr.

21. The tire according to claim 1, wherein said crosslinkable elastomeric composition further comprises at least one elastomeric polymer (b') of one or more monoolefins with an olefinic comonomer or derivatives thereof.

22. The tire according to claim 21, wherein said elastomeric polymer (b') is selected from: ethylene/propylene copolymers or ethylene/propylene/diene copolymers; polyisobutene; butyl rubbers; halobutyl rubbers; or mixtures thereof.

23. The tire according to claim 1, wherein said copolymer of at least one ethylenically unsaturated carboxylic acid or a derivative thereof with at least one ethylenically unsaturated monomer containing at least one polyoxyalkylene side chain (d) is selected from compounds having the following general formula (I):

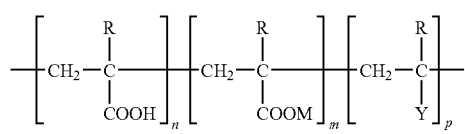

wherein:

R represents a hydrogen atom or a linear or branched $C_1$-$C_4$ alkyl group;

M represents a monovalent or a divalent cation;

n is an integer of 0 to 20;

m and p, which may be equal or different from each other, are an integer of 1 to 20; and Y represents one of the groups having the following general formulae (II), (III) or (IV):

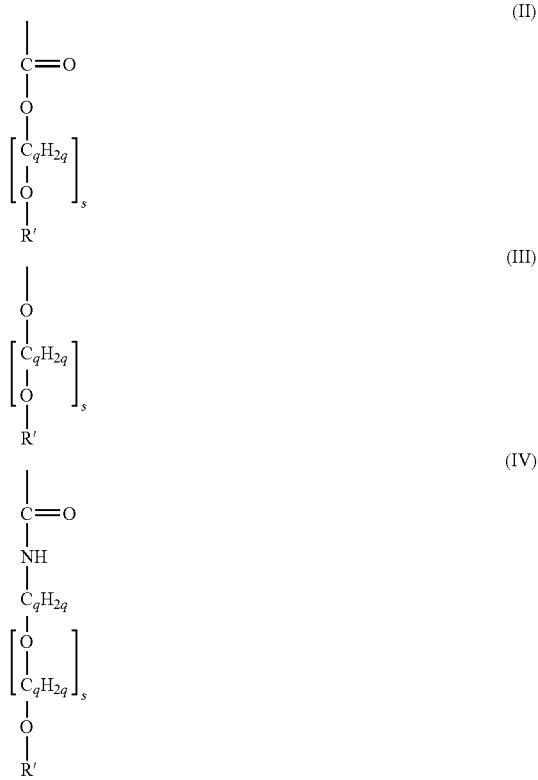

wherein:

R has the same meanings as above;

R' represents a hydrogen atom; a linear or branched $C_1$-$C_{10}$ alkyl group; an R''—$SO_3$M group, wherein R'' represents a linear or branched $C_2$-$C_{10}$ alkylene group and M has the same meanings as above;

q is an integer of 1 to 10; and s is an integer of 1 to 100.

24. The tire according to claim 23, wherein in said compounds having general formula (I) M represents:

an alkali metal cation;

an alkaline-earth metal cation;

an ammonium cation having formula $N(R_1)_4$ wherein $R_1$ groups, which may be equal or different from each other, are selected from: hydrogen atoms, linear or branched $C_1$-$C_{18}$ alkyl groups, $C_6$-$C_{18}$ aryl groups, $C_7$-$C_{21}$ arylalkyl or alkylaryl groups; or a zinc cation.

25. The tire according to claim 1, wherein said copolymer of at least one ethylenically unsaturated carboxylic acid or a derivative thereof, with at least one ethylenically unsaturated monomer containing at least one polyoxyalkylene side chain (d) has a weight-average molecular weight (Mw) of 500 to 100,000.

26. The tire according to claim 25, wherein said copolymer of at least one ethylenically unsaturated carboxylic acid or a derivative thereof, with at least one ethylenically unsaturated monomer containing at least one polyoxyalkylene side chain (d) has a weight-average molecular weight (Mw) of 1,000 to 50,000.

27. The tire according to claim 26, wherein said copolymer of at least one ethylenically unsaturated carboxylic acid or a derivative thereof, with at least one ethylenically unsaturated monomer containing at least one polyoxyalkylene side chain (d) has a weight-average molecular weight (Mw) of 2,000 to 30,000.

28. The tire according to claim 1, wherein said crosslinkable elastomeric composition further comprises (e) at least one polyoxyalkylene glycol in an amount of 0 phr to 10 phr.

29. The tire according to claim 28, wherein said polyoxyalkylene glycol (e) is present in an amount of 0.5 phr to 5 phr.

30. The tire according to claim 28, wherein said polyoxyalkylene glycol (e) is polyoxyethylene glycol.

31. The tire according to claim 1, wherein said crosslinkable elastomeric composition comprises 0 phr to 120 phr of at least one additional reinforcing filler.

32. The tire according to claim 31, wherein said crosslinkable elastomeric composition comprises 20 phr to 90 phr of at least one additional reinforcing filler.

33. The tire according to claim 31, wherein said additional reinforcing filler is silica.

34. The tire according to claim 33, wherein said crosslinkable elastomeric composition comprises at least one silane coupling agent.

35. The tire according to claim 34, wherein said silane coupling agent is selected from a silane having at least one hydrolizable silane group which may be identified by the following general formula (VI):

$(R_2)_3Si—C_tH_{2t}—X$ (VI)

wherein the $R_2$ groups, which may be equal or different from each other, are selected from: alkyl, alkoxy or aryloxy groups or from halogen atoms, on the condition that at least one of the $R_2$ groups is an alkoxy or aryloxy group; t is an integer of from 1 to 6; X is a group selected from: nitroso, mercapto, amino, epoxide, vinyl, imide, chloro, $—(S)_uC_tH_{2t}—Si—(R_2)_3$ or $—S—COR_2$, in which u and t are integers of 1 to 6 and the $R_2$ groups are defined above.

36. A crosslinkable elastomeric composition comprising:
(a) an amount higher than or equal to 30 phr of at least one polyisoprene rubber;
(b) an amount lower than or equal to 70 phr of at least one diene elastomeric polymer other than the polyisoprene rubber (a);
(c) an amount higher than or equal to 30 phr of at least one carbon black reinforcing filler; and
(d) 0.2 phr to 10 phr of at least one copolymer of at least one ethylenically unsaturated carboxylic acid or a derivative thereof with at least one ethylenically unsaturated monomer containing at least one polyoxyalkylene side chain.

37. The crosslinkable elastomeric composition according to claim 36, wherein said polyisoprene rubber (a) is present in an amount of 40 phr to 100 phr.

38. The crosslinkable elastomeric composition according to claim 36, wherein said diene elastomeric polymer (b) other than polyisoprene rubber (a) is present in an amount of 0 phr to 60 phr.

39. The crosslinkable elastomeric composition according to claim 36, wherein said carbon black (c) is present in an amount of 40 phr to 120 phr.

40. The crosslinkable elastomeric composition according to claim 36, wherein said copolymer of at least one ethylenically unsaturated carboxylic acid or a derivative thereof with at least one ethylenically unsaturated monomer containing at least one polyoxyalkylene side chain (d) is present in an amount of 1 phr to 5 phr.

41. The crosslinkable elastomeric composition according to claim 36, wherein said polyisoprene rubber (a) is selected from natural or synthetic polyisoprene rubber.

42. The crosslinkable elastomeric composition according to claim 36, wherein said diene elastomeric polymer (b) other than the polyisoprene rubber (a) is selected from:
a diene elastomer having a glass transition temperature below 20° C.; or
a diene elastomeric polymer selected from: polybutadiene, optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof;
wherein said polybutadiene is optionally present in said elastomeric crosslinkable composition in an amount of 30 phr to 70 phr.

43. The crosslinkable elastomeric composition according to claim 36, further comprising at least one elastomeric polymer (b') of one or more monoolefins with an olefinic comonomer or derivatives thereof.

44. The crosslinkable elastomeric composition according to claim 43, wherein said elastomeric polymer (b') is a copolymer of at least one ethylenically unsaturated carboxylic acid or a derivative thereof with at least one ethylenically unsaturated monomer containing at least one polyoxyalkylene side chain (d), selected from compounds having the following general formula (I):

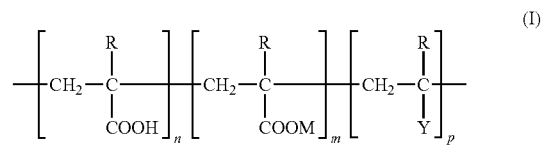

wherein:
R represents a hydrogen atom or a linear or branched $C_1$-$C_4$ alkyl group;
M represents a monovalent or a divalent cation;
n is an integer of 0 to 20;
m and p, which may be equal or different from each other, are an integer of 1 to 20; and
Y represents one of the groups having the following general formulae (II), (III) or (IV):

-continued

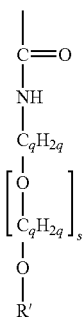
(IV)

wherein:

R has the same meanings as above;

R' represents a hydrogen atom; a linear or branched $C_1$-$C_{10}$ alkyl group; a R"—$SO_3M$ group, wherein R" represents a linear or branched $C_2$-$C_{10}$ alkylene group and M has the same meanings as above;

q is an integer of 1 to 10; and s is an integer of 1 to 100.

45. The crosslinkable elastomeric composition according to claim 36, wherein said copolymer of at least one ethylenically unsaturated carboxylic acid or a derivative thereof with at least one ethylenically unsaturated monomer containing at least one polyoxyalkylene side chain (d) is selected from: compounds having the following general formula (I):

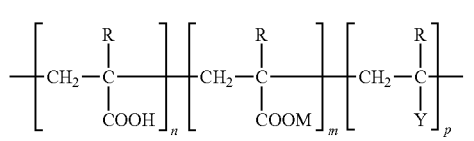
(I)

wherein:

R represents a hydrogen atom or a linear or branched $C_1$-$C_4$ alkyl group;

M represents a monovalent or a divalent cation;

n is an integer of 0 to 20;

m and p, which may be equal or different from each other, are an integer of 1 to 20; and Y represents one of the groups having the following general formulae (II), (III) or (IV):

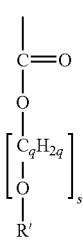
(II)

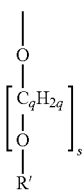
(III)

-continued

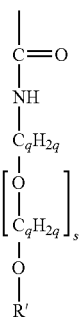
(IV)

wherein:

R has the same meanings as above;

R' represents a hydrogen atom; a linear or branched $C_1$-$C_{10}$ alkyl group; a R"—$SO_3M$ group, wherein R" represents a linear or branched $C_2$-$C_{10}$ alkylene group and M has the same meanings as above;

q is an integer of 1 to 10; and s is an integer of 1 to 100;

or a copolymer of at least one ethylenically unsaturated carboxylic acid or a derivative thereof with at least one ethylenically unsaturated monomer containing at least one polyoxyalkylene side chain (d) having a weight-average molecular weight (Mw) of 500 to 100,000.

46. The crosslinkable elastomeric composition according to claim 45, wherein in said compounds having general formula (I), M represents:

an alkali metal cation;

an alkaline-earth metal cation;

an ammonium cation having formula $N(R_1)_4$ wherein $R_1$ groups, which may be equal or different from each other, are selected from: hydrogen atoms, linear or branched $C_1$-$C_{18}$ alkyl groups, $C_6$-$C_{18}$ aryl groups, $C_7$-$C_{21}$ aralkyl or alkylaryl groups; or a zinc cation.

47. The crosslinkable elastomeric composition according to claim 36, further comprising at least one polyoxyalkylene glycol (e) in an amount of 0 phr to 10 phr.

48. The crosslinkable elastomeric composition according to claim 47, wherein said polyoxyalkylene glycol (e) is present in an amount of 0.5 phr to 5 phr.

49. The crosslinkable elastomeric composition according to claim 36, wherein at least one additional reinforcing filler is present in an amount of 0 phr to 120 phr.

50. The crosslinkable elastomeric composition according to claim 49, wherein said additional reinforcing filler is silica.

51. The crosslinkable elastomeric composition according to claim 50, comprising at least one silane coupling agent selected from a silane having at least one hydrolizable silane group which may be identified by the following general formula (VI):

(VI)

wherein the $R_2$ groups, which may be equal or different from each other, are selected from: alkyl, alkoxy or aryloxy groups or from halogen atoms, on condition that at least one of the $R_2$ groups is an alkoxy or aryloxy group; t is an integer of 1 to 6; X is a group selected from: nitroso, mercapto, amino, epoxide, vinyl, imide, chloro, —$(S)_uC_tH_{2t}$—Si—$(R_2)_3$ or —S—$COR_2$, in which u and t are integers of 1 to 6; and the $R_2$ groups are defined above.

52. A crosslinked manufactured article obtained by crosslinking a crosslinkable elastomeric composition comprising:
- (a) an amount higher than or equal to 30 phr of at least one polyisoprene rubber;
- (b) an amount lower than or equal to 70 phr of at least one diene elastomeric polymer other than the polyisoprene rubber (a);
- (c) an amount higher than or equal to 30 phr of at least one carbon black reinforcing filler; and
- (d) 0.2 phr to 10 phr of at least one copolymer of at least one ethylenically unsaturated carboxylic acid or a derivative thereof with at least one ethylenically unsaturated monomer containing at least one polyoxyalkylene side chain.

* * * * *